Dec. 24, 1940.  G. J. KOEHLER  2,226,169
LIQUID CONTROL VALVE
Filed Oct. 24, 1938
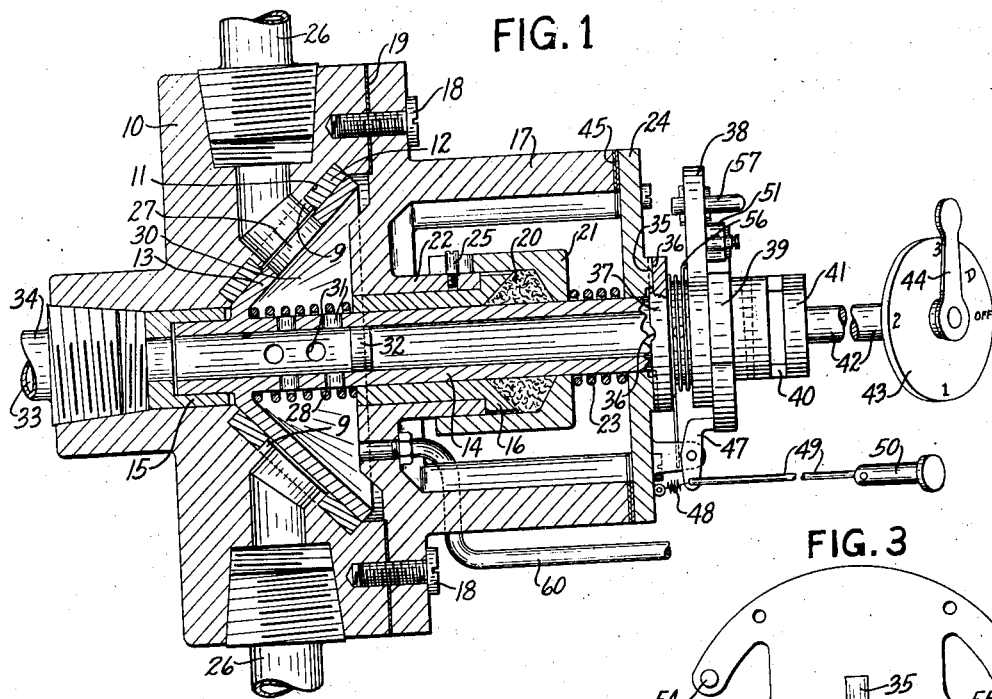
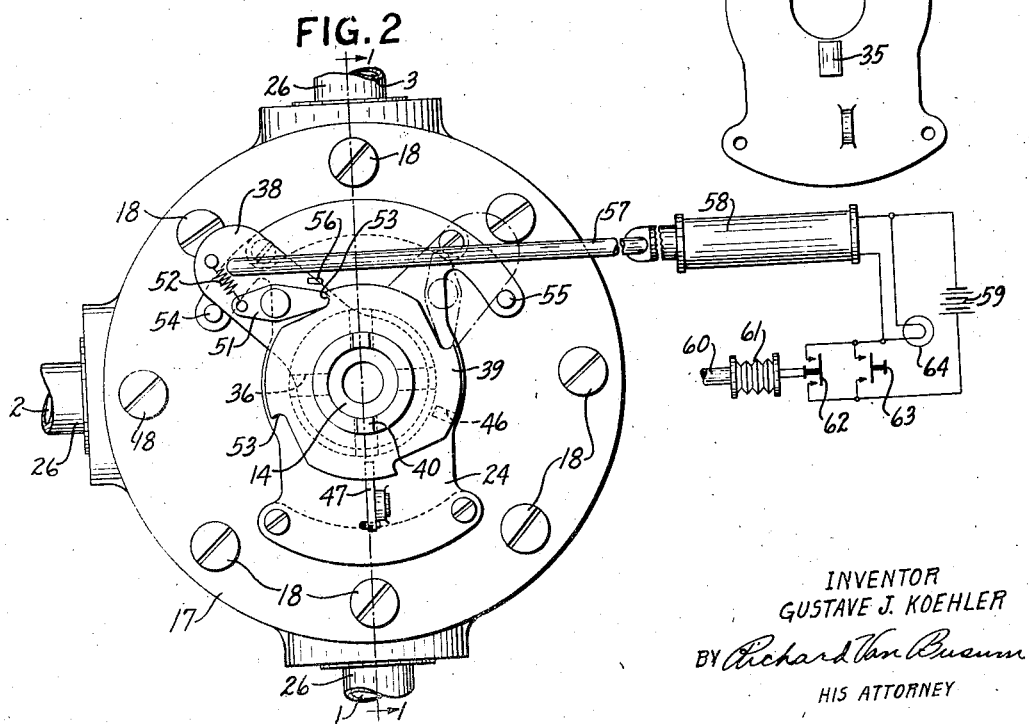
INVENTOR
GUSTAVE J. KOEHLER
BY Richard Van Busum
HIS ATTORNEY Patented Dec. 24, 1940

2,226,169

UNITED STATES PATENT OFFICE 2,226,169

LIQUID CONTROL VALVE

Gustave J. Koehler, Dayton, Ohio

Application October 24, 1938, Serial No. 236,666

6 Claims. (Cl. 251—97)

This invention relates to liquid flow control valves and the like, and is particularly directed to improvements in the construction and control of such valves.

The subject of this invention is an improved liquid control valve which controls the flow of liquid from any or all of several supply sources to a common outlet or source of demand.

It has heretofore been the practice to construct liquid flow control valves with a tapered cork valve member which bears on a corresponding tapered metal seat.

Valves so constructed have a comparatively short period of usefulness due to failure of the cork in some manner or other.

Chief among the disadvantages of a cork seal is its tendency to stick to the seat and the resulting tearing when it is forced to turn after sticking. Also any marring of the protecting coat of the cork permits it to become saturated with fluid and leak. Likewise the cork, through shrinkage, is likely to become deformed, thus ruining its effectiveness as a liquid seal.

The disadvantages outlined above make the valve unreliable and furthermore may prove disastrous when said valve is used, for example, to control the liquid fuel supply of an air or land vehicle.

Therefore, it is broadly an object of this invention to provide an improved liquid control valve having many novel features of construction which overcome all of the disadvantages and objections stated above, and, in addition, has many novel features of construction and operation not found in previous valves and which, it is believed, constitute a decided advance in the art.

For example, the construction of the valve of this invention eliminates entirely the use of cork as a sealing medium and provides a valve that is leak-proof to a degree heretofore unknown in valves of this type.

Whereas, prior valves were operated manually, it is an object of this invention to provide means whereby when one of the several sources of supply runs low or is exhausted, the valve is actuated automatically to shut off the flow from said exhausted supply source and to open up a new supply source. This continues until all of the supply sources are exhausted of liquid, after which the valve is automatically moved to a position where all of the supply sources are simultaneously and completely drained of any liquid remaining therein.

In addition to the automatic actuating mechanism outlined above, a further object is the provision of means to operate the valve semi-automatically, said means being rendered effective by the depression of an electric push-button.

A still further object is to supply means for operating the control valve manually whenever it is necessary or desirable.

Another object is the provision of an automatic warning signal which functions continuously when the liquid supply is dangerously low or exhausted.

With these and incidental other objects in view, the invention includes certain novel features of construction and combinations of parts, the essential elements of which are set forth in appended claims and a preferred form or embodiment of which is hereinafter described with reference to the drawing which accompanies and forms a part of this specification.

In the drawing:

Fig. 1 is a sectional view of the liquid control valve of this invention, taken along line 1—1 (Fig. 2) looking in the direction indicated by the arrows.

Fig. 2 is a plan view of the control valve.

Fig. 3 is a detail view of one member of the valve unseating or lifting cam.

Description

Referring to the drawing, the liquid control valve of this invention has a main casting 10 made of any suitable material and having formed therein a cone-shaped opening 11, the angular face of which is recessed to receive a suitable plastic bearing or sealing compound 12 which forms a seat for the cone-shaped head of a male valve member 13, made preferably of non-corrodible material. The male member 13 has a tubular stem 14, one end of which journals in a non-corrodible bushing 15 pressed into a boring in the casting 10. The other end of the stem 14 journals in a bushing 16 fast in a boring in a casting 17, said boring in axial alinement with the boring in the casting 10. The casting 17 is made of the same material as the casting 10 and forms a cover for the chamber 11 and is secured to said casting 10 by a plurality of screws 18. The gasket 19 forms a seal between the castings 10 and 17. A packing gland 20 fits over the stem 14 and is compressed between an angular surface on the upper end of the bushing 16 and a similar surface in the counter-boring of a packing sleeve 21, said counter-boring being a slip fit on a tenon 22 of the casting 17. Concentric with the counterboring in the sleeve 21 is a hole which is a slip fit on the stem 14.

A compressible spring 23 fits around the stem 14 and between the sleeve 21 and a lifter cam member 24, the latter secured to two arcuate extensions of the casting 17, said spring compresses the gland 20 to form a liquid-proof seal. A screw 25 in the tenon 22 freely engages a slot in the sleeve 21 to prevent said sleeve from turning when the valve stem 14 is rotated.

Spaced at regular intervals around the main casting 10 are three inlet openings, numbered 1, 2 and 3 respectively, which communicate with the conical opening 11 and are connected by their respective tubes 26 to three separate liquid supply sources of any suitable construction. Formed in the casting 10 are annular rings or bosses 9 concentric with the inlet openings 1, 2 and 3 and extending to within a short distance of the sealing surface of the plastic seat 12. These rings serve to anchor the plastic seat firmly in place and eliminate any possibility of small fragments of said plastic breaking off and interfering with operation of the valve or clogging the outlet opening. A single opening 27 in the conical head of the male valve member 13 is adapted to be brought into register with any of the openings 1, 2 and 3 upon rotation of the valve member 13. A compressible spring 28 forces the head of the valve 13 into engagement with the plastic valve seat 12.

As here shown, the opening 27 is in register with the inlet opening No. 3, thus permitting the liquid to flow from the No. 3 supply source into a chamber 30 formed by the hollow conical head of the valve 13 and the opening 11. From the chamber 30 the liquid flows through a series of staggered holes 31 in the stem 14 into the hollow interior of said stem. A plug 32 fast in the hole in the stem 14 obstructs flow of the liquid to the right (Fig. 1) consequently said liquid flows to the left through a hole in the bushing 15 and into an outlet opening 33 connected by a tube 34 to a liquid demand source, such as the internal combustion engine of an air or land vehicle. Obviously the head of the valve 13 obstructs all of the inlet openings except the one in register with the opening 27.

The male valve member 13 has five positions, namely, Nos. 1, 2 and 3 inlet positions, a "drain" position and an "off" position. The valve 13 is rotated by a ratchet mechanism and while being rotated a lifter cam mechanism lifts the head of said valve off of the seat 12 to facilitate the rotation thereof.

The lifter cam 24 has a clearance hole through which extends the stem 14 and also has diametrically opposed cam lugs 35 which cooperate with right-angle cam grooves 36 in a female lifter cam 37 fast on the right hand end of the stem 14. Free on the stem 14 is an operating arm 38 which fits between the hub of the cam member 37 and the face of an operating ratchet 39 secured on the stem 14. A hub of the ratchet 39 has opposed tenons 40 which are engaged by a slot in a disk 41 integral with a shaft 42 which extends through a clearance hole in a stationary indicator dial 43 and has secured on its right hand end an operating lever 44 terminating in a convenient finger piece. The lever 44 provides means for manually operating the control valve and in cooperation with representative markings on the dial 43 serves as an indicator to the position of the valve member 13, and incidentally how the control valve is functioning.

Operating the lever 44 turns the valve 13, and all the parts secured on the stem thereof, causing one of the grooves 36, in the lifter cam 37, to ride off of the cam lugs 35 to shift the valve 13 to the right, against the action of the spring 28, to lift the head of said valve 13 off the seat 12 to ease the turning thereof and to reduce wear on the sealing surfaces of the valve members.

The face of the cam 37, in cooperation with the lugs 35, holds the valve members apart until the valve member 13 nears its next position, whereupon the corresponding cam groove 36, in conjunction with the lugs 35, allows the spring 28 to seat the valve. The grooves 36, in cooperation with the lugs 35, also act as a locating device to retain the valve in its set position.

A plurality of thin shims 45 (Fig. 1) between the extensions of the casting 17 and the lifter cam member 24, provide a means of adjusting said cam member 24 in relation to its companion member 37 so that the proper degree of lift of the valve member 13 may be obtained. The tenon and slot connection between the ratchet 39 and the disk 40 permits said ratchet to shift to the right with the valve member 13 independently of said disk.

The right angle grooves 36 (Fig. 1) correspond to four of the five positions of the valve member 13 as marked on the dial 43 and namely Nos. 1, 2 and 3 supply source positions and an "off" position. When the valve is in "off" position the hole 27 is opposite a solid portion of the seat 12.

While only three supply sources are here shown, it is obviously a simple matter to increase or decrease the number of supply sources without departing from the spirit of the invention.

In addition to the four positions described above, the valve member 13 (Figs. 1 and 2) has a fifth or complete drain position which is midway between the No. 3 and "off" positions, as indicated by the marking "D" on the dial 43 and said position is determined by a depression 46 in the left hand face of the ratchet 39, in cooperation with a pawl 47 fulcrumed on an extension of the cam member 24. A spring 48 urges the pawl clockwise into contact with the face of the ratchet 39.

After the third and final supply source has been exhausted, turning the valve member 13 to the "D" or drain position causes the pawl 47 to engage the depression 46 to obstruct further movement of said member. In this position the cam lugs 35, in cooperation with the face of the cam member 37, hold the face of the valve member 13 off of the seat 12, thus forming an opening which permits all of the supply sources to completely drain through said opening, then through the hole 27 and around the largest diameter of the conical valve head into the chamber 30 and thence to the outlet or demand source.

A wire or cable 49 (Fig. 1) connects the pawl 47 to a pull knob 50, conveniently located for the operator, and provides a means for disengaging said pawl from the notch 46.

In addition to the manual means for operating the control valve, automatic and semi-automatic means are also provided for operating said valve, and such means will now be described.

The arm 38 (Figs. 1 and 2) which it will be recalled is rotatable independently of the stem 14, has pivotally mounted thereon a pawl 51 urged clockwise by spring 52 into engagement with four equally spaced teeth 53 in the periphery of the ratchet 39. The range of movement of the arm 38 is between two stop studs 54 and 55 (Figs. 1 and 2), and a torsion spring 56 urges said arm 38 counterclockwise to normally maintain said arm in contact with the stop stud 54. The bent-over end of a rod 57 engages a hole in the upper end of the arm 38 and is retained in place by two cotter keys. The other end of the rod 57 is pivotally connected to the core of a solenoid 58 adapted to be energized by a battery 59 (Fig. 2), or any other suitable electrical source.

The chamber 30 (Fig. 1) formed in the castings 10 and 17 of the control valve, is connected by a tube 60 to a bellows 61 (Fig. 2) and when the pressure in said chamber 30 decreases, due to the exhausting of the liquid from the supply source, pressure is relieved in said bellows 61. This permits the said bellows 61 to contract causing a contact member 62, connected thereto, to close the circuit between the battery 59 and the solenoid 58, thereby energizing said solenoid.

The magnetic pull of the solenoid, by means of the rod 57, actuates the arm 38 in a clockwise direction, as observed in Fig. 2, against the action of the spring 56 from the full line position to the dot and dash line position, as determined by the stop stud 55. Clockwise movement of the arm 38 causes the pawl 51, in cooperation with one of the teeth 53 in the ratchet 39, to rotate said ratchet and the stem 14 of the valve member 13 clockwise in unison therewith, as observed in Fig. 2. Clockwise movement of the valve member 13 moves said valve member from the exhausted supply position to the next position, thus opening up a new supply source. The solenoid 58 remains energized and as a result the arm 38 remains in moved position until the new supply source creates enough pressure to expand the bellows 61 and break the circuit to said solenoid.

It can be readily seen that automatic operation of the valve member 13, from one supply source to the next, as the pressure decreases in the chamber 30, will continue until said control valve has moved through all of the supply positions and finally comes to rest in the complete drain position, explained earlier herein in connection with manual operation of the control valve. A push-button switch 63 (Fig. 2) is provided for closing the circuit between the battery 59 and the solenoid 58, thus providing semi-automatic means for energizing said solenoid and operating the arm 38 to actuate the control valve in the manner explained above.

An automatic warning signal, such as an electric light 64 (Fig. 2) or any other suitable device, is connected in the circuit of the solenoid 58 and functions continuously when low pressure in the bellows 61 closes the circuit to said solenoid, thus directing attention to the fact that the liquid supply source is in a low or exhausted condition.

It can be readily understood, by observing Fig. 1, that the construction of the control valve, of this invention, is such that if any liquid should happen to leak between the sealing surfaces of the valve members, such liquid will enter the chamber 30 and flow therefrom to the outlet source, thus providing a further valuable safety precaution in case the seat should become defective and leak liquid. The construction of former control valves is such that any liquid which leaks between the sealing surfaces of the valve members is free to flow outside of the valve, vaporize and collect in various pockets as a highly inflammable gas, thus creating a hazard when the valve is used to control the fuel supply of land or air vehicles.

The four positions or teeth 53 in the ratchet 39 correspond to the cam grooves 36, which it will be recalled correspond to the supply positions Nos. 1, 2 and 3 and the "off" position.

Summarizing briefly, the above specification discloses an improved liquid control valve which effectively overcomes all of the disadvantages and shortcomings of former control valves, of this type, and in addition provides a control valve having many novel features of construction and operation not found in said former control valves.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a liquid control device, the combination of a valve body having a valve seat formed therein, said seat having a plurality of inlet openings from as many liquid supply sources; a rotatable valve member journaled in the valve body and cooperating with the seat to form a liquid seal, said member having an opening therein adapted to be moved into register with the various inlet openings as the valve member is rotated to connect the various supply sources to a demand source; yieldable means to retain the valve member in engagement with the seat; a cam contrivance effective upon rotation of the valve member to separate said valve member from the seat to ease rotation thereof, said contrivance also effective under influence of the yieldable means to locate the valve member in register with the inlet openings; means effective after all the supply sources have been depleted, to arrest rotation of the valve member in a position where the cam contrivance will retain said valve member off the seat to permit all the remaining liquid in the various supply sources to flow into the demand source; and manual means to render the arresting means ineffective.

2. In a device of the class described, the combination of a liquid flow control member, having a neutral or "off" position, several supply positions, to connect as many supply sources to a demand source, and a "drain" position where all of the supply sources are simultaneously connected to the demand source; means to rotate the control member progressively from "off" position through the several supply positions and finally to "drain" position; a cam contrivance effective when the control member is rotated and coacting with said control member to simultaneously connect all of the supply sources to the demand source, said contrivance also acting to locate the control member in the various supply positions and the "off" position; and spring actuated means effective after the control member has passed through all of the supply positions to arrest said control member in "drain" position, in which position the cam contrivance causes said control member to simultaneously drain all of the supply sources of any liquid remaining therein.

3. In a liquid control valve, the combination of a body portion having an opening formed therein with an outlet port connecting therewith, one surface of said opening being cone-shaped and having a plurality of inlet ports therein; annular rings formed around each of the inlet ports by depressions in the conical surface, said depressions adapted to be filled with a plastic material which extends slightly above the annular rings and the adjacent conical surface; a positionable valve member having a hollow stem connecting with the outlet port and a frusto-conical head with a comparatively thin wall, the outer surface of which is adapted to engage the plastic seat to form a liquid seal, said head having an opening therein which, upon operation of the valve, is adapted to connect the various inlet ports with a chamber formed by the inside surface of the conical valve head and the opening in the body portion, said chamber connected to the outlet port by holes in the hollow stem of the valve member in cooperation with said hollow stem; a packing member to seal the valve stem against leakage; a comparatively strong spring to compress the packing member; a comparatively weak spring to retain the valve member in contact with the plastic seat; and means actuated by the latter spring to yieldingly retain the valve member in its different positions.

4. In a control valve for controlling the flow of volatile liquid fuel from several supply sources to a demand source, such as an internal combustion engine, the combination of a body portion having an opening formed therein, one surface of said opening being cone-shaped and having a plurality of inlet openings therein, each connecting with its respective supply source, said cone-shaped surface also having an outlet opening therein connecting with the liquid demand source; annular rings formed around each inlet opening by a recess in the conical surface; a plastic material, such as synthetic rubber, molded into the recess to form a resilient valve seat; a frusto-conical valve head with a hollow interior, the outer surface of said head adapted to engage the plastic material to form a liquid seal, said head having an opening therein adapted to connect the various inlet openings with a chamber formed by the hollow interior of said head and the body portion, upon rotation of the valve member; a stem integral with the frusto-conical head, said stem having a hollow portion which connects with the outlet opening, and a plurality of holes therein for connecting the hollow portion thereof with the chamber to form a connection between the various inlet openings and the outlet opening, upon rotation of the valve; and means, effective upon rotation of the valve, to separate the outer surface of the frusto-conical head from the plastic seat to ease the turning of said valve.

5. In a control valve for controlling the flow of volatile liquid fuel from several supply sources to a source of demand, the combination of a body portion having an opening therein forming a conical surface communicating with several inlet ports, said ports connecting with the several supply sources; an annular ring formed around each inlet port by depressions in the conical surface, said depressions adapted to be filled with a plastic material, such as synthetic rubber, which extends a slight distance above the annular rings and the conical surface to form a resilient valve seat; a valve member comprising a hollow stem, opposite ends of which are journaled in the body portion, said hollow stem connecting with an outlet port in said body portion, and a cup-shaped conical head integral with the hollow stem, the outer surface of said conical head cooperating with the resilient seat to form a liquid seal, said conical head having an opening which is brought into register with the various inlet ports, upon rotation of the valve member, to connect said ports with a chamber formed by the interior of the cup-shaped head and the opening in the body portion, said chamber adapted to be connected with the outlet port by a plurality of openings in the hollow stem, which connect said chamber to the hollow portion of said stem; yieldable means to retain the outer surface of the conical valve head in contact with the resilient valve seat; and means actuated by the yieldable means to retain the opening in the valve head in register with the various inlet ports when the valve member is rotated from one position to another.

6. In a liquid control valve, for controlling the flow of volatile liquid fuel such as gasoline, from several supply sources to the internal combustion engine of an air or land vehicle, the combination of a body portion having an opening therein forming a conical surface with several inlet ports merging therewith, each of said inlet ports connecting with one of the several supply sources, said opening having connecting therewith an outlet port in turn connecting with the internal combustion engine; annular rings formed around each inlet port by depressions in the conical surface, said depressions adapted to be filled with a moldable material, such as synthetic rubber, which extends a slight distance above the annular rings and the conical surface to form a resilient valve seat; a cup-shaped conical valve head, the exterior surface of which cooperates with the resilient seat to form a liquid seal, said conical head having an opening which is adapted to be brought into register with the various inlet ports, upon rotation of said conical head to connect said inlet ports with a chamber formed by the interior surface of the cup-shaped head and the opening in the body portion; a valve stem integral with the conical head and journaled in the body portion, said stem having a hollow portion connecting with the outlet port, said hollow portion in turn connected with the chamber formed by the cup-shaped head and the opening in the body portion by a plurality of openings in said stem; yieldable means to retain the exterior surface of the conical head in contact with the resilient seat; and means including male and female cam members carried respectively by the body portion and the valve stem and operable against the yieldable means to lift the exterior surface of the conical head away from the resilient seat, upon rotation of said stem and said conical head, to ease the rotation thereof, said means also adapted to locate the opening in said conical head in register with the inlet ports as said conical head is rotated from one position to another.

GUSTAVE J. KOEHLER.